April 21, 1970 — A. W. SCHUELER — 3,508,027
IMPACT WELDING MACHINES
Filed Nov. 18, 1963 — 3 Sheets-Sheet 1

ARTHUR W. SCHUELER
INVENTOR.

BY Harold K. Parsons
HIS ATTORNEY

ARTHUR W. SCHUELER
INVENTOR.

BY Harold K. Parsons
HIS ATTORNEY

April 21, 1970

A. W. SCHUELER 3,508,027

IMPACT WELDING MACHINES

Filed Nov. 18, 1963

ARTHUR W. SCHUELER
INVENTOR.

BY Harold K. Parsons
HIS ATTORNEY

United States Patent Office 3,508,027
Patented Apr. 21, 1970

3,508,027
IMPACT WELDING MACHINES
Arthur W. Schueler, Cincinnati, Ohio, assignor to Precision Welder and Flexopress Corporation, Cincinnati, Ohio, a corporation of Ohio
Filed Nov. 18, 1963, Ser. No. 324,534
Int. Cl. B23k 11/04
U.S. Cl. 219—97
19 Claims

ABSTRACT OF THE DISCLOSURE

An impact welding machine includes both fixedly and slideably supported work holders. A fluid drive motor and magnetic armature are connected to the slideable work holder for driving it in the direction of the fixed work holder. Magnets are located in force receiving relationship with the armature. A bucking mechanism, intervened by a collapsible linkage, is connected to the movable holder for retarding movement in the direction of the fixed holder. Through the arrangement of fluid control valves, the drive system is controlled in a manner that motor overrides the retarding force of the bucking mechanism so that the movable holder is slowly advanced towards the fixed holder during the weld flash period. As the movable holder advances and the workpieces are heated, the intervening linkage is collapsed. At the same time, the magnets are activated to drive the workpieces into welding engagement unimpeded by the retarding force of the bucking mechanism.

---

This invention relates to improvements in impact welding machines and has special reference to a novel and improved machine of particular utility in joining copper and aluminum and other inherently difficult to weld materials.

The invention disclosed herein is an improved welding machine that includes a fixed work holder and a second work holder. Means are provided for automatically controlling the velocity of the second work holder as it moves during the welding cycle. The velocity is controlled during the initial stages of movement as well as during the flashing period. During the final period of flashing the second work holder is accelerated so as to eliminate or greatly reduce the tendency of oxides to form on the surface of the heated metal.

One of the objects of the present invention is the provision of a flash welder having a control system in which the rate of travel of a movable platen is modulated and controlled in relation to the advancing position of the platen and which will have an extremely high rate of acceleration of the movable platen during the closing and upset portion of the cycle.

Another object of the invention is the provision of such an improved welder embodying simple control features for regulating the initial velocity of the movable platen, for modulating such velocity during the flashing period by means of an adjustable acceleration cam, for determining the precise point during the cycle at which the upset is to be initiated and for applying at this point auxiliary activating means for effecting rapid acceleration of the platen.

The further object of the invention is the provision in connection with the machine of the character above identified of means for effecting extremely high rate of platen travel immediately prior to the final formation of the weld to overcome the tendency of oxide or the like to form on the surface of the heated metal and extrude same from the weld zone along with any excess of molten metal at the face of the parts being united.

This invention also has for its object the provision in connection with a snubbing control for rate advance of the platen, of mechanism automatically effective completely to eliminate the reaction of the snubbing system by mechanical disengagement thereof as respects the platen so that the only impediment to its ultimate acceleration will be the friction of its bearings and inertia of the platen parts.

An additional object of the invention is the provision in connection with a welder as aforesaid of a magnetic force delayed forge mechanism preferably effective simultaneously with the disengagement of the snubbing system which will react with an extremely high impact force against the platen followed by a continuing magnetic force of lower magnitude.

Other objects and advantages of the present invention should be readily apparent by reference to the following specification considered in conjunction with the appended claims and it will be understood that any modifications in the specific details herein shown and described may be made within the scope of the appended claims without departing from or exceeding the spirit of the invention.

Figure 1:
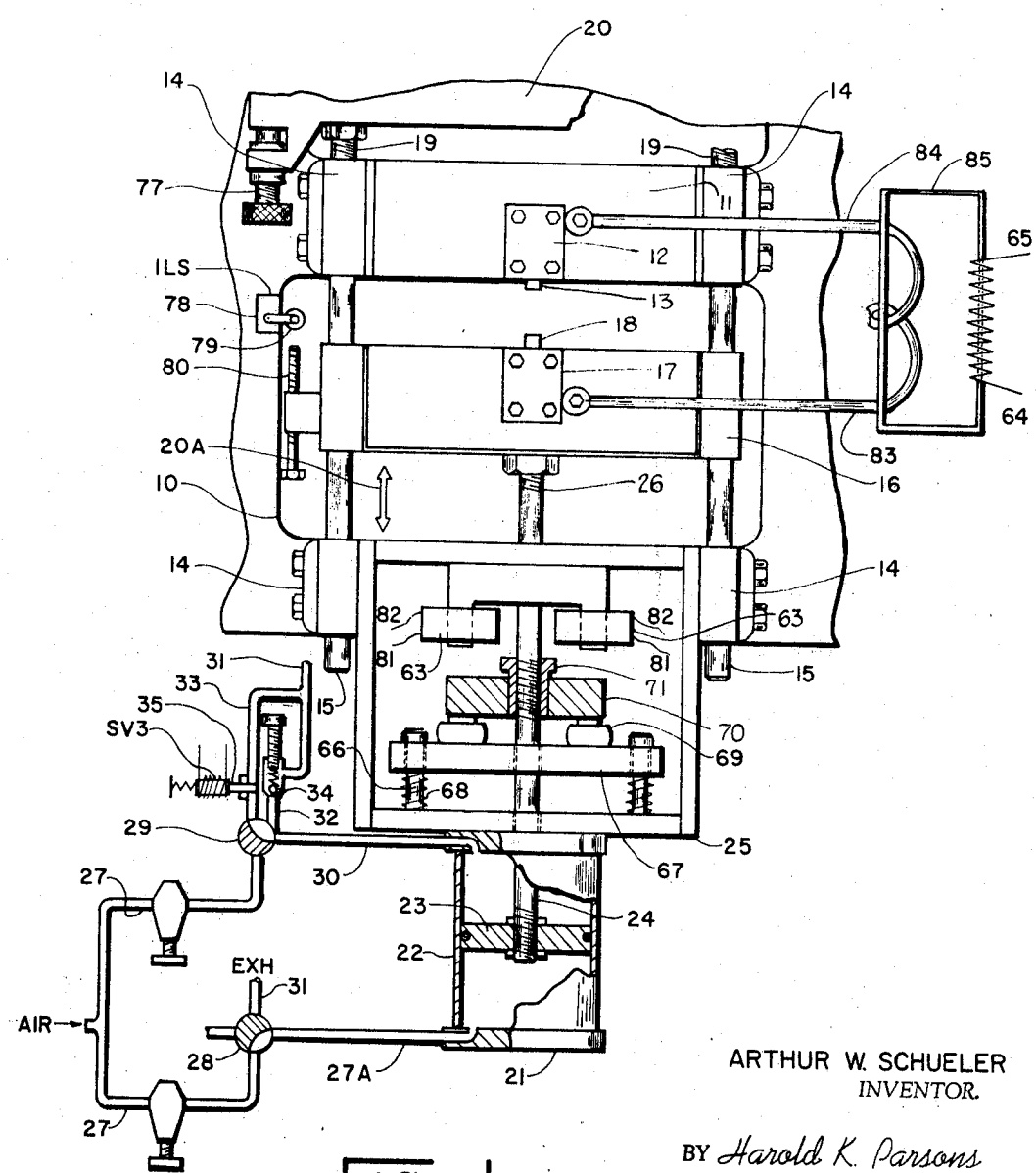
FIGURE 1 is a schematic plan view diagrammatically illustrating the left hand portion of a machine embodying the novel features and controls of the present invention.

The present invention has particular reference to a flash butt welding machine, in which the parts to be joined are gripped by jaws or fixtures and one part is caused to move in relation to the other fixed part. A source of voltage is applied to the two platens holding the parts and the movable part is brought into close proximity to the stationary part with voltage applied. The parts make contact at random points causing local conditions of high resistance to the resulting current flow due to the impressed voltage. These isolated points of high contact resistance carry current of sufficient magnitude to cause local arcing. As these high points burn away other irregularities on the surface of the parts to be joined are brought into contact and the sequence of events is repeated. This flashing action continues as metal is burned from the faces of the two parts to be joined. When sufficient arcing has occurred to raise the temperature of the two pieces to the welding temperature, the movable platen is caused to accelerate, driving the one part against the other part with such force that impurities and oxides contained in the weld zone are driven out, resulting in a weld of high purity and consistency.

I have found that certain difficult to weld materials such as copper and aluminum require extremely high rates of final platen travel in order to bring the parts forcefully into contact prior to the metal temperature dropping below that temperature required for producing acceptable welds. This velocity must be extremely high for aluminum due to the tendency for aluminum oxide to form on the surface of the heated metal. If the platen travel is fast enough the oxide formation can be kept to a minimum and this oxide can be extruded from the weld zone along with the excess molten metal adhering to the face of the part.

As a part of the present invention initial use is made of a hydraulic snubbing system platen advance rate control, in connection with means to completely eliminate the snubbing effect of the hydraulic system by mechanically disengaging the hydraulic system at the instant of upset, so that the only impediment to final platen acceleration is the friction of the bearings and inertia of the platen parts. To effect additive acceleration of the movable platen and final formation of the weld, there is provided in connection with said mechanical snubbing action disengagement a delayed forge feature which permits the generation of extremely high impact forces followed by continuous magnetic force of a lower magnitude.

In the drawings, in which similar characters of reference are employed to denote corresponding parts throughout the several views, the numeral 10 designates the main bed or support of the machine having mounted thereon a fixed platen 11 carrying a work holding fixture 12 for the work piece 13. Slideably mounted in bearings 14 are the guides 15 having secured thereto and movable therewith the second or movable platen 16, carrying the work holding fixture 17 for a work piece 18.

Adjustably secured to the projecting end portions 19 of the slide rods 15 is a cross head 20 mounting various of the cycle control mechanisms of the machine.

For effecting reciprocation of the movable platen directionally as indicated by the arrow 20A, use is made of a hydraulic (or pneumatic) prime mover source or motor 21 secured to the support 10 and including the outer cylinder 22 and contained piston 23. Rod 24 of piston 23 extends upwardly or to the right of the machine across the frame portion 25 and has a screw thread portion 26 adjustably connecting it to the movable platen 16.

This provides a prime mover utilizing a primary hydraulic or pneumatic actuating pressure and controlled bucking or back pressure to determine the ultimate force applied by way of the movable platen to the subsequently described hydraulic bucking system during the flashing period.

Actuating medium for the motor is supplied by a suitable fluid pressure source through conduit 27 and reversing valve 28 shown in FIGURE 1 in position to connect pressure to the outer end of the cylinder. In this view the second valve 29 is diagrammatically shown in position to connect conduit 30 by way of conductors 32 and 33 to exhaust conduit 31. Conduit 32 is provided with a pressure relief valve 34 settable to determine the back pressure against piston 23 opposing the forward or actuating pressure in the bottom left hand end of cylinder 22 as respects the machine, while conduit 33 includes a dumping valve 35 normally in closed position but actuable as hereinafter described into an open position so that there is unrestricted flow from 30 through 33. This structure therefore provides a bucking action in motor 21 to decrease the force applied to the movable platen and linkage during the flashing period while at the instant of initiation of upset of the weld the bucking pressure may be dumped to permit use of the full driving force of the motor 21 during the upset period.

It will be understood that at the completion of the weld operation main control valves 28 and 29 are reversed as later described introducing pressure from 27 through conduit 30 to the right hand or inner end of the motor retracting piston 23 and associated parts while the outer end of the motor is connected through valve 28 to exhaust.

Figure 2:
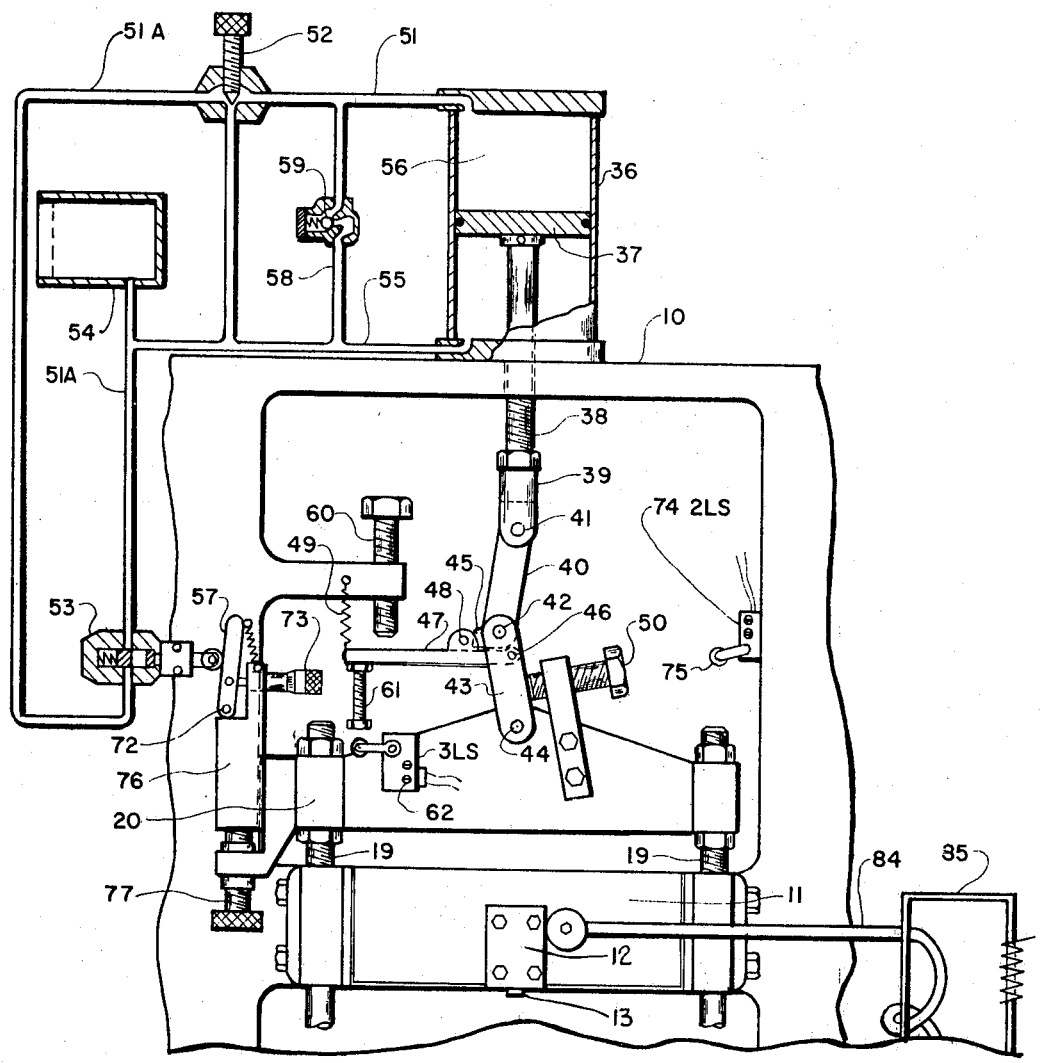
FIGURE 2 is a similar view in plan illustrating the right hand portion of the machine.

Shown at the upper or right hand end of the machine in FIGURE 2 as secured to the frame 10 is a second bucking mechanism rate control structure comprising the cylinder 36 containing piston 37 having extending inwardly, or to the left, the piston rod 38 on the inner end of which is adjustably supported the yoke or clevis 39. This yoke is coupled by a two-link three-in lever system or toggle to the cross head 20 forming a part of the movable platen structure. The first link 40 is connected by pin 41 to the yoke 39 and in turn has its outer or free end joined by pivot 42 to the free end of link 43 having its opposite end secured by pivot 44 to the cross head 20.

As indicated in FIGURE 2, the link 40 is provided with a locking abutment 45, while pivoted to the link 43, at 46 is a trip lever 47 having a latch portion 48 urged into locked position with the abutment by spring 49.

When the center of the middle pin of the linkage 40–43 is offset from the center line of the pivots 41–44, the latch on the one link will firmly engage the abutment lug on the other link and as pressure is applied from the cross head to the piston 37 the linkage is locked and transmits a snubbing force from the hydraulic snubbing motor to the movable platen. An adjustable stop 50 limits the outward swinging movement of lever 43 to prevent an into line or outward past center movement of the linkage.

Coupled with the outer end of the hydraulic snubbing cylinder 36 is the conduit 51 having the first branch extending to the adjustable or settable throttle valve 52, and a second branch 51-A extending to the variably positionable cam-controlled throttling valve 53, said valves jointly regulating pressure effected discharge of hydraulic medium from the right hand end of the cylinder to the sump or supply tank 54. A second open conduit 55 couples the inner end of the cylinder to said supply tank.

It will be evident that as the movable platen is urged to the right by pressure in motor 22 this movement will be resisted through the rigidly connected linkage 43–40, piston 37 and the fluid substantially impounded at 56 in the snubbing cylinder 36. The permissible rate of movement of the parts including the platen primarily will be the setting of the throttle valve 52, supplemented as the platen advances by the reaction of cam 57 on throttle valve 53 permitting of a speeding up movement. A bypass conduit 58, including one way operating check valve 59, inter-connects conduits 51 and 55 permititng of free flow of hydraulic medium from 55 to 51 and the right hand end of the cylinder when force is applied during the return or separating movement of the platens and retraction of the bucking piston 37.

The latch lever 47 has a portion projecting beyond the latch 48. Mounted on the bed 10 and projecting into the path of movement of the projecting portion of the lever is an adjustable stop or trip member 60. During progress of the cross head and lever the latter will eventually engage the adjustable stop. As the platen and linkage continue to move while the end of the latch remains stationary the locking dog 48 will be disengaged from the lug. The toggle linkage 40–43 is then free to collapse, in effect completely disconnecting or disengaging the platen and cross head from the bucking or rate control piston 37, thus completely eliminating the snubbing effect of the hydraulic system by mechanically disengaging the system from the platen so that it exerts no impediment to the final platen acceleration movement.

Figure 3:
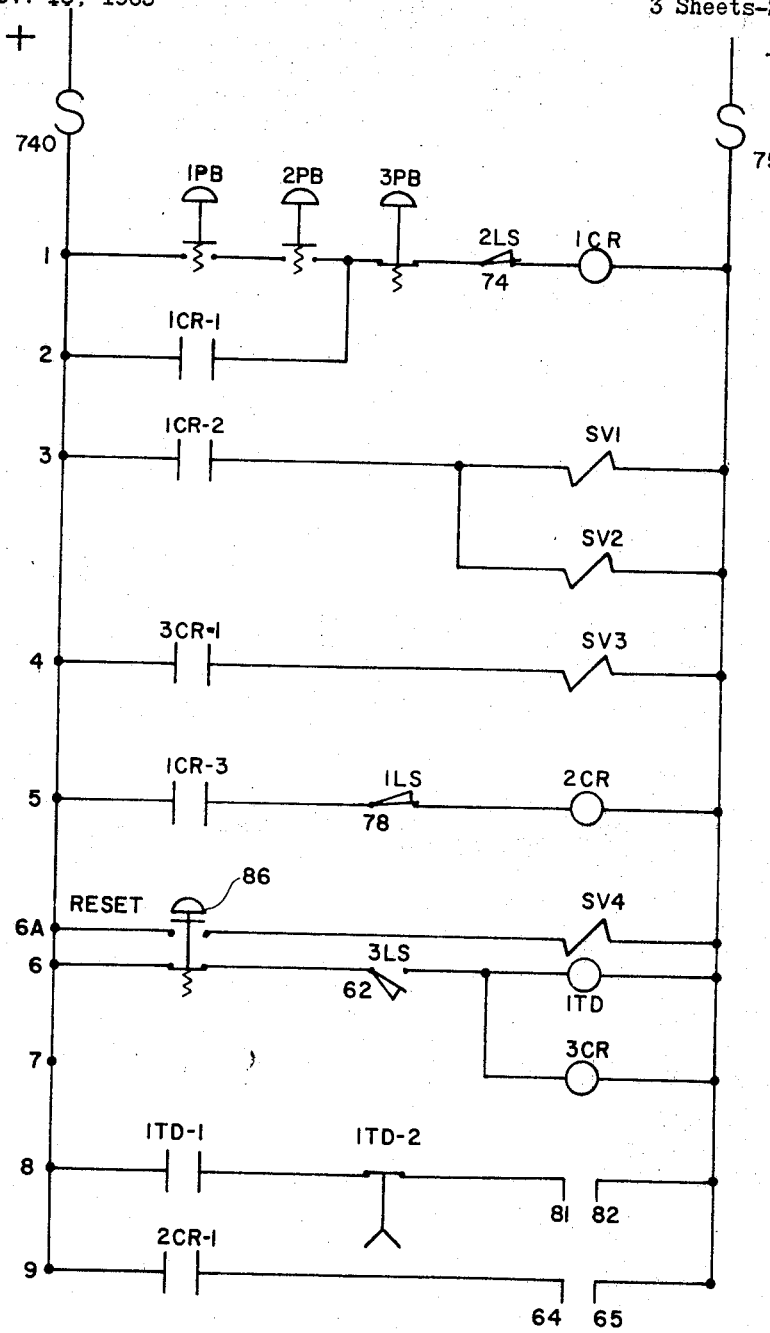
FIGURE 3 is a diagrammatic plan view illustrating the basic control means including electrical control and operating circuits and mechanisms for effecting the automatic cyclic operation of the machine.

Simultaneously with the release or collapse of this connecting linkage, the lever 47 reacts to close the switch mechanism 62 (3LS). This as shown on the electrical diagram FIGURE 3 is effective to energize 1TD line 6 to close 1TD–1 line 8 which through leads 81–82 energizes the impact forging magnets 63.

Closing of 3LS through 3CR line 7 and 3CR–1 line 4, also energizes SV3 opening dumping valve 35 connecting conduit 30 from the right hand end of cylinder 22 to discharge conduits 33–31 eliminating all bucking resistance to movement of piston 23 so that the entire force in pressure conduit 27A is effective for unrestrained advance of platen 16 and workpiece 18.

The basic structural features of the impact welding mechanism are shown in FIGURE 1. As there indicated, the frame 25 supports guide posts 66 on which is slideably mounted the magnet carrier 67 yieldably urged toward the right by springs 68 and carrying the holding magnets 69. Slidable on collar 71 is the impact armature 70 normally held to the left by magnets 69 as indicated in FIGURE 1 but forcibly projectable toward the right to strike an impacting blow on anvil collar 71 on the piston rod 24 when the high force magnitude magnets 63 are energized. It will be understood that this action creates a delayed weld forging impact blow against the movable platen and work piece held thereby when the armature is attracted by the magnets 63 followed by a continuous magnetic force urge of the armature and thus the work piece to the right of a lower magnitude.

In the performance of flash butt welding operations, and particularly in uniting of copper, aluminum or other materials, it is preferable that during the early flashing period the platen velocity—as controlled by the valve 52—is essentially constant until the temperature of the material has been raised sufficiently to permit flashing acceleration. In the present machine, where the parts are shown in an intermediate position toward the right of the movable platen, the cam member 57 is shown as engaging the roller contact of automatic throttle valve 53 so that continued movement toward the right will raise this valve in a continuous incremental manner to decrease its throttling action and thus permit of speeding up of movement of the platen.

It will be noted that the cam 57 is pivoted to the cam support 76 at 72 and that a micrometer adjusting device 73 carried by the cam support is effective minutely to vary the angular position or slope of the cam 57. There is thereby provided an adjustable cam which, by its reaction on the valve 53, provides a flashing speed control of the advance of the platen and work generating a variable parabolic flashing velocity as the weld operation approaches completion.

The cam support 76 is slideably mounted on cross head 20 with its position determined by the cam support adjusting screw 77. This provides a means of adjusting the point of initiation of the constant acceleration phase of the flashing period.

Mounted on the frame 20 is a limit switch 1LS, line 5 (78) having a trip arm 79 projecting into the path of movement of the trip screw 80 carried by the movable platen 16, and effective to cut off weld current at the predetermined point of platen travel.

This switch de-energizes 2CR line 5, opening 2CR–1, line 9 and thus the transformer 85 primary circuit through leads 64–65.

Adjustably mounted on the bed 10 is an additional limit switch 2LS (74) line 1 having a trip arm 75 projecting into the path of movement of the end 19 of one of the slide rods 15, effective to cut off power and power controls and stop the machine at a lineal movement determined by termination of the welding operation.

CYCLE CONTROL MECHANISM

The electrical control mechanism for the machine operations just described has been diagrammatically illustrated in FIGURE 3. As there shown, it comprises the primary plus bus line 740, and the minus bus line 75, while the lineal identification positions of the several control circuits potentially extending from one to the other of said bus lines have been consecutively numbered.

As there indicated, line 1 includes the pair of starting push buttons 1PB and 2PB designed to be individually simultaneously manually actuated; the emergency stop push botton 3PB normally spring held in circuit closing position; the normally spring closed limit switch 2LS (74); and the normally open control relay 1CR.

When the contacts of 1PB and 2PB are both closed relay 1CR is energized. This closes the holding circuit through normally open 1CR–1, line 2, holding 1CR closed when spring opened 1PB and 2PB are released.

1CR also closes 1CR2, line 3, energizing solenoid valve controls SV1 and SV2 for reversing valves 28 and 29 respectively to shift these valves into the position shown in FIGURE 1, pressure then being introduced from supply conduit 27 by way of valve 28 to conduit 27A and the left hand end of motor cylinder 22, while the other end of the motor is coupled through conduit 30, valve 29, for discharge through conduits or passages 32 and 33 to exhaust conduit 31.

Pressure in the left end of the motor cylinder 22 will move the piston 23, platen 16, cross-head 20 and unitarily coupled or associated parts to the right, while the adjustable pressure regulator 34 in conduit 32 maintains a predetermined lower bucking pressure in the right hand end of the cylinder 22 to reduce the load on the linkage 40–43–47.

At the same time, 1CR3, line 5, through normally closed limit switch 1LS (78) closes or energizes 2CR. This closes 2CR1, line 9, of the weld current control circuit including the primary leads 64 and 65, suitably coupled with one side of the weld current transformer 85. The output side of the transformer is coupled through leads 83 and 84 and the platens 11 and 16 to the workpieces 13 and 17 to be united, and is now effective.

As the platen 16 and cross-head 20 advance, adjustable trip stop or abutment 60 trips lever 47, unlocking linkage 40–43 permitting it to collapse. This throws the adjustable trip actuator 61 against 3LS (62), line 6, closing this normally open switch. Closing of 3LS, line 6 operates 1TD to close 1TD1, line 8, and through normally closed automatic releasing time delay switch 1TD2 completes the circuit through leads 81–82 instantaneously to energize the forge magnets 63. These react to cause forging impact movement of impact armature 70 to the right striking impact collar 71, and thereafter maintaining subsequent magnetic forging pressure until automatic opening of time delay switch 1TD–2 line 8 de-energizes said magnets.

Switch 3LS (62) line 6, simultaneously energizes 3CR, line 7, closing 3CR–1, line 4, energizing solenoid valve control SV3, to open dumping valve 35, releasing impacted or impounded movement resisting fluid in the right hand end of cylinder 22.

At this time, due to the collapse of the linkage 40–43 and dumping of the cylinder 22 all previously existing machine effected resistance to platen movement is instantaneously released and eliminated so that the pressure forces of the motor 22 and magnets 63 are unrestrainedly effective to impart to the platen optimum speed and force movements for weld completion.

The advance movement of the platen 16 shifts micrometer trip 80 carried by the platen to engage and operate limit switch 1LS (78) line 5, carried by the bed 10, releasing 2CR, line 5 to open 2CR–1, line 9, de-energizing leads 64–65 and the weld transformer 85.

Finalized movement of the platen 16 under combined influence of pressure against piston 23 and the re-action of magnets 63 against the armature 70 results in tripping of normally closed limit switch 2LS (74) line 1, stopping the machine with the weld circuit shut off for removal of the work and re-setting for a new cycle.

Tripping of 2LS (74), line 1, de-energizes 1CR, permitting 1CR–1, line 2, 1CR–2, line 3, and 1CR–3, line 5 to open.

This de-energizes the holding circuit through 1CR–1, line 2; the activating circuits through 1CR–2, line 3, releasing SV–1 to permit spring actuation of valve 28 to a position coupling 27A with exhaust 31; and simultaneously releasing solenoid valve holding circuit SV2 for valve 29, leaving piston 23 and platen 16 in an unpowered or free floating condition, both ends of cylinder 22 being coupled to reservoir.

Clamps 12 and 17 having been released and the finished work removed, to reset the machine pressure on RESET button 86 lines 6 and 6A de-energizes 1TD, line 6 and 3CR line 7. The latter opens 3CR–1, line 4, permitting the spring urged dumping valve to close.

While held depressed, RESET button 86 closes the circuit line 6A energizing SV4 to shift valve 29 into a position to couple pressure supply line or conduit 27 with conduit 30, introducing pressure into the right hand end of cylinder 22, moving piston 23 and coupled elements to the left.

This opens the machine for reception of new work pieces to be joined, collar 71 retracting anvil armature 70 restoring its engagement with the holding magnets 69, trip 80 disengaging limit switch 1LS (78) which closes, and 19 disengaging limit switch 2LS (74) which also closes, thus conditioning the electrical circuits for an ensuing cycle.

As the cross-head 20 retracts, displacement of hydraulic medium in the left end of cylinder 36, and intake of medium into the right end of the cylinder past valves 52 and 59 will resist movement of piston 37 and rod 38, straightening linkage 40–43 to the extent that lock 48 on lever 47 activated by the spring 49 will be interengaged with abutment 45 on link 40 to lock the linkage in extended position to resist closing movement of the platen 16 and associated parts as hereinabove described.

What is claimed is:

1. An impact welding machine including a movable work holder, a slide mounting for supporting the work holder, a control cross head carried by the slide mounting, a first piston and cylinder reciprocating hydraulic motor, a first reciprocating piston rod coupling the motor and mounting for actuation of the mounting, a rate control means comprising a bucking motor including a second piston rod, power transmitting linkage comprising a first link having one end pivoted to the cross head, a second link having one end pivoted to said second piston rod, means pivotally connecting the other ends of said links, means to lock said links in extended power transmitting position including a release lever, a welding impact armature slidably mounted on said first rod, an armature abutment anvil on said first rod, forging magnets adjacent the armature on the side remote from the first motor, means to supply hydraulic actuating medium to the outer end of the first motor, control means including a discharge conduit having a dumping valve coupled to the inner end of the motor, electric controls for operating the dumping valve and energizing the forging magnets, and switch means operable by release movement of the release lever to activate said controls to open the dump valve and energize the forge magnets.

2. An impact welding machine including a movable work holder, a slide mounting for the work holder, a control cross head carried by the slide mounting, a first piston and cylinder reciprocating hydraulic motor, a first reciprocating piston rod coupling the motor and mounting for actuation of the mounting, a rate control means comprising a bucking motor including a second piston rod, power transmitting linkage comprising a first link having one end pivoted to the cross head, a second link having one end pivoted to said second piston rod, means pivotally connecting the other ends of said link means to lock said links in extended power transmitting position including a release lever, welding impact armature slidably mounted on said first rod, an armature abutment anvil on said first rod, forging magnets adjacent the armature on the side removed from the first motor, means to supply hydraulic actuating medium to the outer end of the first motor, control means including a discharge conduit having a dumping valve coupled to the inner end of the motor, electric controls for operating the dumping valve and energizing the forging magnets, and switch means operable by release movement of the release lever to activate said controls to open the dump valve and energize the forge magnets, said rate control means including a bucking motor discharge conduit system, a first settable rate control valve in said system, a second variably positionable supplemental rate control valve in the system, and cam means movable with the slide mounting operatively engaging said second valve to control its effective positioning during movement of the slide.

3. An impact welding machine as claimed in claim 2 in which said cam means is adjustable, and means for adjusting the cam means to vary its reaction on the supplemental rate control valve.

4. An impact butt joint welding machine comprising a support, a fixed work holder on the support, a second work holder mounted on the support for movement toward and from the fixed work holder and means for controlling the cyclic movement of said second work holder including an actuating cylinder, a piston reciprocable in the cylinder having a rod connected to the said second work holder for actuation thereof, work holder advance bucking mechanism for resisting movement of said second work holder, a collapsible linkage intervening the second work holder and said mechanism, means for locking the linkage in extended position, rigidly to connect the second work holder and bucking mechanism, and additional means to release said locking means to permit collapse of the linkage, whereby the second work holder is freed for unrestrained movement with respect to said bucking means.

5. An impact butt joint welding machine comprising a support, a fixed work holder on the support, a second work holder mounted on the support for movement toward and from the fixed work holder and means for controlling the cyclic movement of said second work holder including an actuating cylinder, a piston reciprocable in the cylinder having a rod connected to the said second work holder for actuation thereof, work holder advance bucking mechanism for resisting movement of said second work holder, a collapsible linkage intervening the second work holder and said mechanism, means for rigidly locking the linkage in an extended position, so as to connect the holder and bucking mechanism and additional means to release said locking means to permit collapse of the linkage, whereby the second work holder is freed from unrestrained movement with respect to said bucking means in which said bucking means includes a hydraulic fluid impounding cylinder, and a rate control piston in the cylinder, said collapsible linkage intervening and connecting said second work holder and said rate control piston.

6. An impact butt joint welding machine comprising a support, a fixed work holder on the support, a second work holder mounted on the support for movement toward and from the fixed work holder and means for controlling the cyclic movement of said second work holder including an actuating cylinder, a piston reciprocable in the cylinder having a rod connected to the said second work holder for actuation thereof, work holder advance bucking mechanism for resisting the movement of said second work holder, a collapsible linkage intervening the holder and said mechanism, means for rigidly locking the linkage in an extended position to connect the second work holder and bucking mechanism, and additional means to release said locking means to permit collapse of the linkage, whereby the second work holder is freed for unrestrained movement with respect to said bucking means in which said bucking means includes a hydraulic fluid impounding cylinder, and a rate control piston in the cylinder, said collapsible linkage intervening and connecting said second work holder and said rate control piston, a control for the rate of movement of the piston including a discharge system coupled with the cylinder, a settable rate valve in the conduit system for throttling the system to establish a basic potential rate of said piston movement, and a supplemental throttle valve in the conduit system movable to vary the basic movement rate established by the settable valve.

7. An impact butt joint welding machine comprising a support, a fixed work holder on the support, a second work holder mounted on the support for movement toward and from the fixed work holder and means for controlling the cyclic movement of said second work holder including an actuating cylinder, a piston reciprocable in the actuating cylinder having a rod connected to the said second work holder for actuation thereof, work holder advance bucking mechanism for resisting movement of said second work holder, a collapsible linkage intervening the second work holder and said mechanism, means for rigidly locking the linkage in an extended position, so as to connect the second work holder and bucking mechanism, and additional means to release said locking means to permit collapse of the linkage, whereby the second work holder is freed for unrestrained movement with respect to said bucking means in which said bucking means includes a hydraulic fluid impounding cylinder, and a rate control piston in the cylinder, said collapsible linkage intervening and connecting said second work holder and said rate control piston, a control for the rate of movement of the piston including a discharge conduit system coupled with the cylinder, a settable rate valve in the conduit system for throttling the system to establish a basic potential rate of said pison movement, and a supplemental throttle valve in the conduit system movable to vary the basic movement rate established by the settable valve, means coupled to and movable with the second work holder automatically to adjust said supplemental valve and thus the rate of movement of the second work holder.

8. An impact butt joint welding machine comprising a support, a fixed work holder on the support, a second work holder mounted on the support for movement toward and from the fixed work holder and means for controlling the cyclic movement of said second work holder including an actuating cylinder, a piston reciprocable in the cylinder having a rod connected to the said second work holder for actuation thereof, work holder advance bucking mechanism for resisting movement of said second work holder, a collapsible linkage intervening the second work holder and said mechanism, means for rigidly locking the linkage in extended position to connect the second work holder and bucking mechanism, and additional means to release said locking means to permit collapse of the linkage, whereby the second work holder is freed for unrestrained movement with respect to said bucking means in which said bucking means includes a hydraulic fluid impounding cylinder, and a rate control piston in the cylinder, said collapsible linkage intervening and connecting said second work holder and said rate control piston, a control for the rate of movement of the piston including a discharge conduit system coupled with the cylinder, a settable rate valve in the conduit system for throttling the system to establish a basic potential rate of said piston movement, and a supplemental throttle valve in the conduit system movable to vary the basic movement rate established by the settable valve, means coupled to and movable with the second work holder automatically to adjust said supplemental valve and thus the rate of movement of the second work holder, an actuator on the valve, in which said movable means includes an adjustable cam positioned to the actuator during movement of the second work holder.

9. A welding machine as claimed in claim 8 including variable means to adjust the position of the cam and thus its rate determining reaction on the actuator.

10. A welding machine as claimed in claim 4, in which said lock release means includes a trip lever movable with the second work holder and an adjustable trip carried by the support and projecting into the path of movement of the lever.

11. An impact butt joint welding machine comprising a support, a fixed work holder on the support, a second work holder mounted on the support for movement toward and from the fixed work holder and means for controlling the cyclic movement of said second work holder including an actuating cylinder, a piston reciprocable in the cylinder having a rod connected to the said second work holder for actuation thereof, work holder advance bucking mechanism for resisting movement of said second work holder, a collapsible linkage intervening the second work holder and said mechanism, means for rigidly locking the linkage in extended position to connect the second work holder and bucking mechanism, and additional means to release said locking means to permit collapse of the linkage, whereby the second work holder is freed for unrestrained movement with respect to said bucking means, said collapsible linkage including a pair of links, pivoted respectively to the movable platen mechanism and the bucking mechanism, a pivot connecting the links, and said means for locking the linkage includes an abutment on one of the links, and a lever pivoted to the other of the links having a portion interfitting with the abutment.

12. A welding machine as claimed in claim 11, in which said lever has an extended trip operable actuating portion for engagement with the lock releasing means and additional means for moving the lever into its said locking position.

13. An impact welding machine as claimed in claim 4, including impact means for advancing the second work holder, and means operable in sequence with the release of the said locking means for activating the impact means to impart a forging movement to the released second work holder.

14. An impact welding machine as claimed in claim 6, including an impact armature supported for reaction against the second work holder, means for actuating said armature, and control means operable upon release of said locking means for energizing said actuating means.

15. Cycle control means for an impact welding machine embodying a power source circuit, a fixed work holder and a movable carriage supporting a second opposed movable work holder, a hydraulic motor for actuation of the carriage and work holder, releasable means for maintaining a back pressure on the motor, and disconnectable bucking mechanism coupled with the carriage to control the rate of advance thereof, said control means including a first trip mechanism activated by movement of the carriage to disconnect the bucking mechanism, additional sequentially operable trip mechanism for activation of the releasable back pressure control means, and subsequently effective trip control means operated by movement of the carriage to neutralize the hydraulic motor and to interrupt the power circuit.

16. A machine as claimed in claim 15, in which the bucking mechanism includes a collapsible linkage, and in which the specified first trip mechanism is effective to initiate collapse of the linkage.

17. Cycle control means for an impact welder embodying a power source circuit, a fixed work holder and a movable carriage supporting a second opposed movable work holder, a hydraulic motor for actuation of the carriage and work holder, releasable means for maintaining a back pressure in the motor, a disconnectible bucking mechanism coupled with the carriage to control the rate of advance thereof, an energizable impact mechanism for imparting an impact advance to the carriage, and an interruptible weld circuit for effecting heating of work in the holders, said cycle control means including a first trip mechanism activated by movement of the carriage to disconnect the bucking mechanism, additional trip means for activation of the releasable back pressure control means, a third trip means operable in sequence with said first and additional trip means for effecting energization of the impact mechanism for reaction on the carriage, and subsequently effective trip control means operated by movement of the carriage to neutralize the hydraulic motor and to interrupt the power circuit.

18. A machine as claimed in claim 15, which includes additional control means for effecting reverse actuation of the hydraulic motor and associated parts of the machine.

19. A machine as claimed in claim 17, which includes additional control means for effecting reverse actuation of the hydraulic motor and associated parts of the machine.

References Cited

UNITED STATES PATENTS

| | | | |
|---|---|---|---|
| 2,647,980 | 8/1953 | Moore | 219—97 |
| 2,892,068 | 6/1959 | Park et al. | 219—89 X |

JOSEPH V. TRUHE, Primary Examiner

J. G. SMITH, Assistant Examiner